(No Model.)
G. F. DAY.
CHURN.
No. 329,443. Patented Nov. 3, 1885.
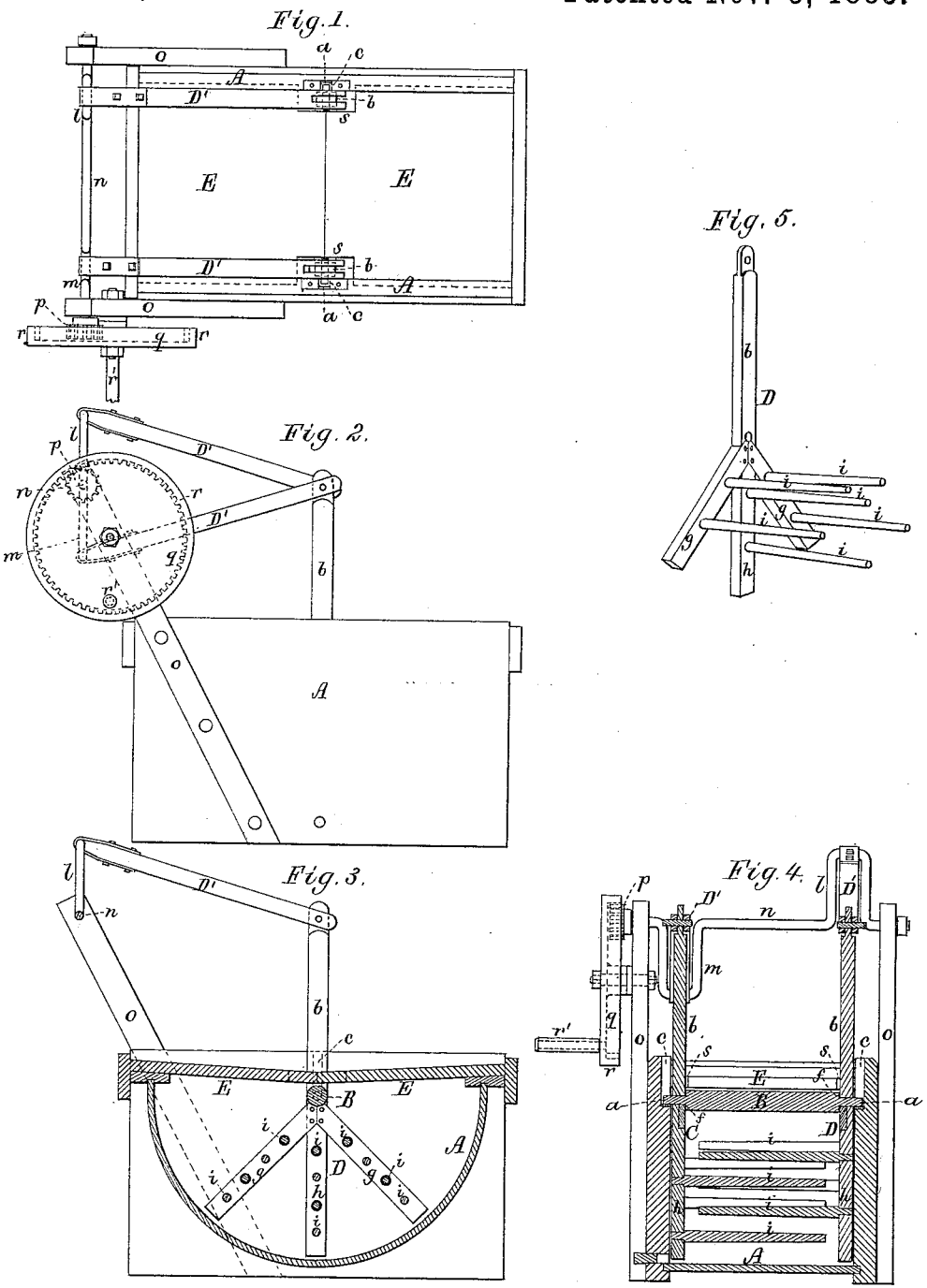
Witnesses
S. N. Piper.
Ernest P. Pratt.
Inventor.
George F. Day.
by R. Hildy, att'y.

UNITED STATES PATENT OFFICE.

GEORGE FREDERICK DAY, OF SHUBENACADIE, NOVA SCOTIA, CANADA.

CHURN.

SPECIFICATION forming part of Letters Patent No. 329,443, dated November 3, 1885.

Application filed March 2, 1885. Serial No. 157,455. (No model.)

*To all whom it may concern:*

Be it known that I, GEORGE FRED. DAY, of Shubenacadie, in the county of Hants, of the Province of Nova Scotia, of the Dominion of Canada, have invented a new and useful Improvement in Churns; and I do hereby declare the same to be described in the following specification and represented in the accompanying drawings, of which—

Figure 1 is a top view, Fig. 2 a side elevation, Fig. 3 a longitudinal section, and Fig. 4 a transverse and median section, of a churn provided with my invention, the nature of which is defined in the claim hereinafter presented. Fig. 5 is a perspective view of one of the dashers.

In such drawings the reservoir A of the churn is represented as having a bottom which is curved lengthwise in the form of a semicircular arc, the axis of which coincides with that of the pivotal shaft B of the two dashers. This shaft is furnished with two journals, $a$ $a$, extending from opposite ends of it, through and somewhat beyond the upper arms, $b$ $b$, of the two dashers C and D. The parts of the journals projecting outwardly beyond the said arms not only extend into short vertical grooves $c$ $c$ in the sides of the reservoir, but rest on the bottoms of such grooves, such bottoms constituting bearings to support the two journals, each of which extends from a shoulder, $f$, at the end of the shaft. The distance between the two shoulders is that to which the arms $b$ $b$ of the dashers are to be held apart, from which it will be seen that the pivotal shaft is not only to sustain the journals of the two dashers, but to keep the latter at their proper distance asunder. Each dasher has two arms, $g$ $g$, arranged at a right angle, or thereabout, to each other. It also has an arm, $h$, projecting down midway between the arms $g$ $g$, such arm $h$ being in line with and in continuation of the arm $b$. From each of the arms $g$ and $h$ certain prongs $i$ are projected toward the opposite dasher-arms, the prongs of one dasher being arranged so as while the two dashers are being reciprocated the prongs of one shall not interfere with those of the other. The longest arms of the two dashers are jointed at or near their upper ends to two connection rods or bars, D', such bars at their outer ends being jointed to the wrists of two double cranks, $l$ and $m$, extending in opposite directions from a shaft, $n$. This shaft, journaled in two standards, $o$ $o$, extending upward from opposite sides of the reservoir, has fixed upon it at one end a toothed pinion, $p$, arranged within and engaging with a gear, $q$, whose teeth are on the inner periphery of a circular flange, $r$, that forms part of the gear $q$. From this latter gear a crank, $r'$, extends. By taking hold of the crank and revolving the gear $q$ the dashers will be reciprocated within the reservoir, each dasher during each vibratory movement moving in a direction opposite to that of the other. By separating the connecting-bars from the dashers both of the latter, with their pivotal shaft B, can be lifted out of the reservoir, after which the dashers can be drawn off the journals of the said shaft B in order to be cleaned or washed, as occasion may require. There are to the reservoir two separate covers, E, adapted to it, so as to slide lengthwise of it, in grooves in its sides, and to meet together at its middle, each cover being notched at its inner part, as shown at $s$, to allow of the proper vibratory movements of the upper arms of the dashers.

In practice a churn constructed as above described has been found to be exceedingly efficient. To use it, a person has only to charge the reservoir with cream, and afterwards to put the two dashers in rapid movement, which will be accomplished by revolving the larger gear by means of its crank. By having the teeth of such larger gear to project from the inner periphery of a circular flange extending over the pinion or lesser gear the teeth of the gears become so covered that a person is not liable to get his clothing caught by and between the gears.

I claim—

The combination of the pivoted three-armed dasher-frames, the cross-bar, the churn-body provided with slots for reception of the tenons on the ends of said bar, and the operating mechanism, all being substantially as set forth.

GEORGE FREDERICK DAY.

Witnesses:
JACOB L. BARNHILL,
NICHOLAS POWER.